U S 010901512 B 1
US010901512B1

(12) United States Patent
Sills

(10) Patent No.: US 10,901,512 B1
(45) Date of Patent: *Jan. 26, 2021

(54) TECHNIQUES FOR SIMULATED PHYSICAL INTERACTION BETWEEN USERS VIA THEIR MOBILE COMPUTING DEVICES

(71) Applicant: Google LLC, Mountain View, CA (US)

(72) Inventor: Maxwell Andrew Sills, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,786

(22) Filed: Aug. 5, 2019

Related U.S. Application Data

(63) Continuation of application No. 14/724,924, filed on May 29, 2015, now Pat. No. 10,372,212.

(51) Int. Cl.
  *G06F 3/01* (2006.01)
(52) U.S. Cl.
  CPC .................... *G06F 3/016* (2013.01)
(58) Field of Classification Search
  None
  See application file for complete search history.

(56) References Cited

U.S. PATENT DOCUMENTS

| 2,014,062 | A | | 9/1935 | Lemuel |
| 5,942,733 | A | | 8/1999 | Allen et al. |
| 6,492,760 | B1 | * | 12/2002 | Matsuda ............... H02N 2/0025 310/316.01 |

(Continued)

FOREIGN PATENT DOCUMENTS

| CN | 103257783 A | 8/2013 |
| CN | 103677250 A | 3/2014 |

(Continued)

OTHER PUBLICATIONS

Pei, G., "A Micro Capacitive Pressure Sensor With Two Deformable Electrodes: Design, Optimization and Fabrication," Thesis, National University of Singapore, 206, 182 pages.

(Continued)

*Primary Examiner* — Fekadeselassie Girma
(74) *Attorney, Agent, or Firm* — Lowenstein Sandler LLP

(57) ABSTRACT

The technology disclosed herein may simulate physical interaction between users via their wearable computing devices. An example mechanism may involve receiving, by a first mobile computing device, an input of a pressure sensor that is configured to detect a magnitude of applied pressure associated with a first user; transmitting a signal to a second mobile computing device that corresponds to the magnitude of the applied pressure; receiving a signal from the second mobile computing device that corresponds to pressure sensor input for the second mobile computing device, wherein the pressure sensor input is associated with pressure associated with a second user; and causing a haptic actuator communicatively coupled to the first mobile computing device to generate a haptic output corresponding to the pressure associated with the second user, wherein the haptic actuator causes a body configured to extend or retract to alter stiffness to generate the haptic output.

20 Claims, 3 Drawing Sheets

(56) References Cited

U.S. PATENT DOCUMENTS

| | | | |
|---|---|---|---|
| 8,493,354 B1* | 7/2013 | Birnbaum | G06F 3/0414 345/173 |
| 8,570,296 B2* | 10/2013 | Birnbaum | G06F 3/0416 345/173 |
| 9,116,546 B2* | 8/2015 | Birnbaum | G06F 1/1626 |
| 9,393,493 B2* | 7/2016 | Danny | A63F 13/24 |
| 9,443,410 B1* | 9/2016 | Constien | G08B 21/0446 |
| 9,740,299 B2* | 8/2017 | Govindapillai | G06F 3/04817 |
| 9,837,597 B2* | 12/2017 | Sashida | H04R 17/00 |
| 10,101,887 B2* | 10/2018 | Bernstein | G06F 3/0488 |
| 10,372,212 B2* | 8/2019 | Sills | G06F 3/016 |
| 2002/0054015 A1 | 5/2002 | Wingett et al. | |
| 2003/0138044 A1* | 7/2003 | Ueda | G11B 27/28 375/240.08 |
| 2004/0207542 A1 | 10/2004 | Chang et al. | |
| 2008/0088602 A1 | 4/2008 | Hotelling | |
| 2008/0153554 A1* | 6/2008 | Yoon | H04M 19/041 455/567 |
| 2009/0031237 A1* | 1/2009 | Jessen | G06F 3/0481 715/768 |
| 2009/0143106 A1 | 6/2009 | Meitzler et al. | |
| 2010/0130257 A1* | 5/2010 | Jang | G06F 3/04883 455/566 |
| 2010/0151916 A1 | 6/2010 | Baek et al. | |
| 2010/0214243 A1 | 8/2010 | Birnbaum et al. | |
| 2010/0259472 A1* | 10/2010 | Radivojevic | G06F 3/017 345/156 |
| 2010/0283588 A1* | 11/2010 | Gomez | G06F 3/016 340/407.2 |
| 2010/0283731 A1* | 11/2010 | Grant | G06F 3/016 345/158 |
| 2011/0001707 A1* | 1/2011 | Faubert | G06F 3/044 345/173 |
| 2011/0025480 A1* | 2/2011 | Hwang | H04M 19/047 340/407.1 |
| 2011/0036181 A1* | 2/2011 | Fritzsche | B25J 13/084 73/862.046 |
| 2011/0069024 A1 | 3/2011 | Kim | |
| 2011/0102162 A1* | 5/2011 | Gregorio | G09G 3/296 340/407.2 |
| 2011/0105955 A1* | 5/2011 | Yudovsky | G01P 15/09 600/595 |
| 2011/0128132 A1* | 6/2011 | Ullrich | G06F 3/16 340/407.1 |
| 2011/0134030 A1 | 6/2011 | Cho | |
| 2011/0167391 A1 | 7/2011 | Momeyer et al. | |
| 2011/0261021 A1* | 10/2011 | Modarres | G06F 3/0412 345/177 |
| 2012/0013541 A1* | 1/2012 | Boka | G06F 3/0488 345/173 |
| 2012/0028577 A1* | 2/2012 | Rodriguez | H04M 1/725 455/41.1 |
| 2012/0056733 A1* | 3/2012 | Ramsay | G06F 1/1626 340/407.2 |
| 2012/0068835 A1* | 3/2012 | Li | G06F 3/016 340/407.2 |
| 2012/0162113 A1* | 6/2012 | Lee | G08B 6/00 345/173 |
| 2012/0229400 A1* | 9/2012 | Birnbaum | G06F 3/0488 345/173 |
| 2012/0306632 A1* | 12/2012 | Fleizach | H04M 1/72519 340/407.2 |
| 2013/0033366 A1* | 2/2013 | McDonough | G06F 3/016 340/407.1 |
| 2013/0222280 A1 | 8/2013 | Sheynblat et al. | |
| 2013/0241718 A1* | 9/2013 | Wang | G06F 3/016 340/407.1 |
| 2013/0287242 A1* | 10/2013 | Nabata | H04R 17/00 381/388 |
| 2013/0307786 A1* | 11/2013 | Heubel | G08B 6/00 345/173 |
| 2013/0335319 A1* | 12/2013 | Balasundaram | G06F 3/03547 345/156 |
| 2013/0344919 A1* | 12/2013 | Kim | G06F 3/042 455/566 |
| 2014/0055358 A1* | 2/2014 | Birnbaum | G06F 3/016 345/168 |
| 2014/0062682 A1* | 3/2014 | Birnbaum | G08B 6/00 340/407.2 |
| 2014/0123003 A1* | 5/2014 | Song | G06F 1/1626 715/701 |
| 2014/0160010 A1* | 6/2014 | Jung | G06F 3/0414 345/156 |
| 2014/0168117 A1* | 6/2014 | Kim | H04M 1/6505 345/173 |
| 2014/0268515 A1* | 9/2014 | Smoot | G06F 3/03545 361/679.01 |
| 2014/0274056 A1* | 9/2014 | Hyde | H04W 48/18 455/436 |
| 2014/0274078 A1* | 9/2014 | Hyde | H04W 16/18 455/446 |
| 2014/0370938 A1* | 12/2014 | Lee | H04M 1/0266 455/566 |
| 2015/0022328 A1* | 1/2015 | Choudhury | A61H 23/00 340/12.5 |
| 2015/0072738 A1* | 3/2015 | Mankowski | H04M 1/72552 455/566 |
| 2015/0268733 A1* | 9/2015 | Govindapillai | G06F 3/0482 715/863 |
| 2015/0277559 A1* | 10/2015 | Vescovi | G06F 21/31 345/173 |
| 2016/0004309 A1* | 1/2016 | Modarres | G06F 3/0412 345/173 |
| 2016/0027209 A1* | 1/2016 | Demirli | G06T 19/003 345/419 |
| 2016/0070304 A1* | 3/2016 | Shin | G06F 1/1656 361/679.26 |
| 2016/0142526 A1* | 5/2016 | Lu | H04M 1/72533 455/419 |
| 2016/0259470 A1* | 9/2016 | Ledet | G06F 3/016 |
| 2018/0126264 A1* | 5/2018 | Grant | A63F 13/98 |

FOREIGN PATENT DOCUMENTS

| | | |
|---|---|---|
| CN | 103999022 A | 8/2014 |
| CN | 104049734 A | 9/2014 |
| JP | 2005267174 A | 9/2005 |
| JP | 2008113719 A | 5/2008 |
| JP | 2014179085 A | 9/2014 |
| JP | 2015503173 A | 1/2015 |
| WO | 2013096227 A1 | 6/2013 |

OTHER PUBLICATIONS

USPTO, Office Action for U.S. Appl. No. 14/724,924, dated Aug. 3, 2017.

USPTO, Final Office Action for U.S. Appl. No. 14/724,924, dated Nov. 30, 2017.

USPTO, Office Action for U.S. Appl. No. 14/724,924, dated Jun. 7, 2018.

USPTO, Final Office Action for U.S. Appl. No. 14/724,924, dated Oct. 18, 2018.

USPTO, Notice of Allowance for U.S. Appl. No. 14/724,924, dated Mar. 19, 2019.

USPTO, Notice of Allowance for U.S. Appl. No. 14/724,924, dated Apr. 30, 2019.

PCT International Search Report and Written Opinion dated Aug. 3, 2016 for PCT International Application No. PCT/US2016033267, 10 pages.

Chinese Patent Application No. 201680018899.7, Office Action dated Sep. 16, 2019, 16 pages.

European Patent Application No. 04 77 7301, Office Action dated Aug. 3, 2020, 11 pages.

Japanese Patent Application No. 2017-550857 Office Action dated Oct. 1, 2018, 4 pages.

(56) References Cited

OTHER PUBLICATIONS

Japanese Patent Application No. 2017-550857 Office Action dated Jun. 3, 2019, 2 pages.

* cited by examiner

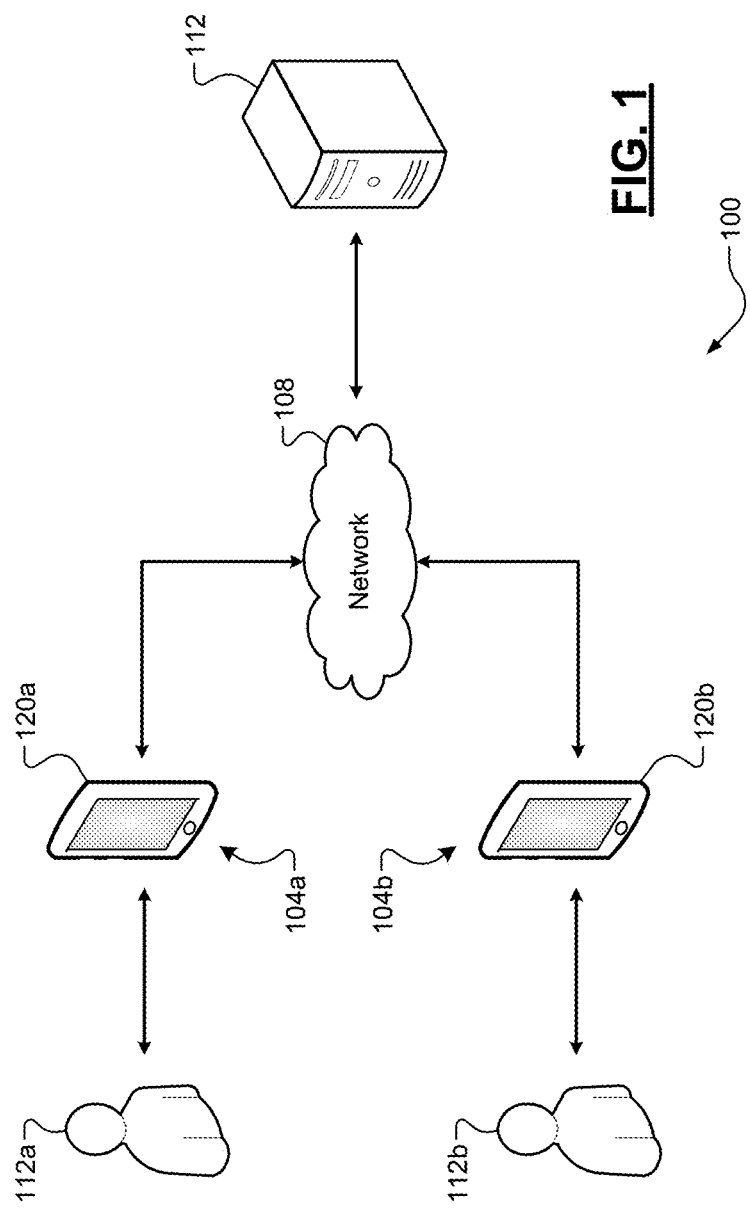

TECHNIQUES FOR SIMULATED PHYSICAL INTERACTION BETWEEN USERS VIA THEIR MOBILE COMPUTING DEVICES

RELATED APPLICATIONS

The present application is a continuation of application Ser. No. 14/724,924, filed May 29, 2015, entitled "Techniques for Simulated Physical Interaction Between Users Via their Mobile Computing Devices," which is incorporated by reference herein.

FIELD

The present disclosure generally relates to mobile computing devices and, more particularly, to techniques for simulated physical interaction between users via their mobile computing devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Users can communicate via their mobile computing devices using audio and/or video mediums. Examples of conventional audio/video mediums include speech, such as a telephone or voice call, images (text, emoticons, pictures, etc.), and pre-recorded or live videos. While a live video medium may provide for a most real or life-like interaction between the users, this and the other conventional audio/video mediums lack any physical connection between the users.

SUMMARY

A computer-implemented method is presented. The method includes receiving, at a first mobile computing device having one or more processors, a first input signal from a first set of pressure sensors associated with the first mobile computing device, the first input signal having been generated by the first set of pressure sensors in response to a first force applied by a first user, and transmitting, from the first mobile computing device to a second mobile computing device, the first input signal, wherein receipt of the first input signal causes the second mobile computing device to generate and output a first output signal based on the first input signal, and wherein the output of the first output signal causes a first set of haptic actuators associated with the second mobile computing device to generate a second force to be felt by a second user.

A first mobile computing device having one or more processors configured to perform operations is also presented. The operations can include receiving a first input signal from a first set of pressure sensors associated with the first mobile computing device, the first input signal having been generated by the first set of pressure sensors in response to a first force applied by a first user, and transmitting, to a second mobile computing device, the first input signal, wherein receipt of the first input signal causes the second mobile computing device to generate and output a first output signal based on the first input signal, and wherein the output of the first output signal causes a first set of haptic actuators associated with the second mobile computing device to generate a second force to be felt by a second user.

A non-transitory, computer-readable medium having instructions stored thereon is also presented. When executed by one or more processors of a first mobile computing device, the instructions cause the first mobile computing device to perform operations including receiving a first input signal from a first set of pressure sensors associated with the first mobile computing device, the first input signal having been generated by the first set of pressure sensors in response to a first force applied by a first user, and transmitting, to a second mobile computing device, the first input signal, wherein receipt of the first input signal causes the second mobile computing device to generate and output a first output signal based on the first input signal, and wherein the output of the first output signal causes a first set of haptic actuators associated with the second mobile computing device to generate a second force to be felt by a second user.

In some implementations, the first set of pressure sensors comprises one or more external, standalone pressure sensors configured to: (i) receive a squeeze input from the first user, and (ii) generate the first input signal in response to the squeeze input, wherein the one or more external standalone pressure sensors are configured to communicate with the first mobile computing device via a short-range wireless communication medium.

In some implementations, the first set of pressure sensors comprises a set of integrated pressure sensors that are either (i) attached an exterior surface of the first mobile computing device or (ii) integrated in the exterior surface of the first mobile computing device, and are (a) each configured to receive a squeeze input from the first user and (b) collectively configured to generate the input signal in response to the squeeze input. In some implementations, the set of integrated pressure sensors comprise a plurality of integrated pressure sensors arranged about the exterior surface of the first mobile computing device.

In some implementations, the first set of actuators comprises a set of vibrators integrated in the second mobile device. In some implementations, the first set of actuators comprises a set of actuators comprises one or more piezoelectric actuators separate from a set of vibrators integrated in the second mobile device.

In some implementations, the operations further comprise: receiving, at the first mobile computing device from the second mobile computing device, a second input signal, the second input signal having been received at the second mobile computing device from a second set of pressure sensors associated with the second mobile computing device in response to a third force applied by the second user, generating, at the first mobile computing device, a second output signal based on the second input signal, and outputting, from the first mobile computing device to a second set of haptic actuators associated with the first mobile computing device, the second output signal, wherein the output of the second output signal causes the second set of haptic actuators to generate a fourth force to be felt by the first user.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a diagram of an example computing network including example mobile computing devices according to some implementations of the present disclosure;

DETAILED DESCRIPTION

Figure 2A:
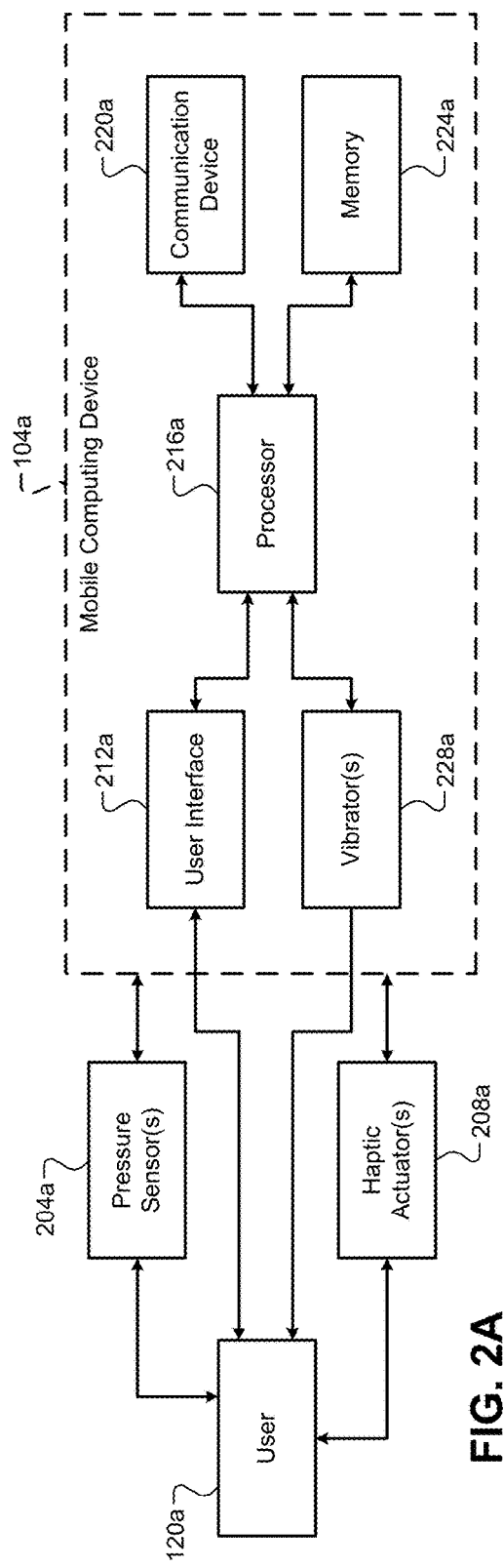
FIGS. 2A-2B are functional block diagrams of the example mobile computing devices of FIG. 1.

As previously mentioned, conventional audio/video communication mediums lack any physical connection between the users. Accordingly, techniques for simulated physical interaction between users via their mobile computing devices are presented. The techniques utilize pressure sensors and haptic actuators of the users' mobile computing devices to sense pressure at one of the mobile computing devices and output a corresponding haptic output at the other mobile computing device, thereby simulating a physical interaction between the users. In one implementation, the users are each holding their mobile computing device (and, in some implementations, an external pressure sensor and/or haptic actuator) in their hand(s) and the simulated interaction is simulated hand holding. These techniques can be safer for users on the move (e.g., texting or video chatting while walking). The techniques can also provide for a more discrete or private interaction between the users in public places compared to other mediums such as a real-time video session. While simulated hand holding is discussed in detail herein, it should be appreciated that these techniques could be applied to simulate other physical interactions between the users. For example, one of the users could position their mobile computing device in another appropriate location, such as their head, shoulder, or back, to simulate the touch by the other user. For example only, the receiving user could secure their phone in a special pocket or receptacle in their clothing.

Referring now to FIG. 1, an example computing network 100 is illustrated. The computing network 100 includes example first and second mobile computing devices 104a and 104b, respectively (collectively "mobile computing devices 104") that can communicate with each other via a network 108. First and second users 112a and 112b, respectively (collectively "users 112") can be associated with the first and second mobile computing devices 104a and 104b, respectively. While pairs of users/mobile computing devices are illustrated, it should be appreciated that the techniques of the present disclosure could be applied to groups of three or more users/mobile computing devices. Examples of the mobile computing devices 104 include mobile phones and tablet computers. In one implementation, the mobile computing devices 104 are handheld mobile computing devices (e.g., mobile phones) that can be gripped using a single hand. The mobile computing devices 104 may also be in communication with at least one server 116 via the network 108. The mobile computing devices 104a, 104b can also define first and second exterior surfaces 120a, 120b, respectively.

Referring now to FIG. 2a, a functional block diagram of the example first mobile computing device 104a is illustrated. The first mobile computing device 104a can be associated with a first set of pressure sensors 204a and a first set of haptic actuators 208a. The first mobile computing device 104a can further include a first user interface 212a, a first processor 216a, a first communication device 220a, a first memory 224a, and, optionally, a first set of vibrators 228a. In one implementation, the first set of pressure sensors 204a and/or the first set of haptic actuator 208a are external, standalone devices in communication with the first communication device 220a via a short-range wireless communication medium (Bluetooth, near field communication (NFC), etc.). This provides for greater customization without requiring a manufacturer of the first mobile computing device 104a to integrate such devices. In another implementation, however, the first set of pressure sensors 204a and/or the first set of haptic actuators 208a are integrated in the first mobile computing device 104a (e.g., as part of the first user interface 212a).

The first user interface 212a includes components configured to receive input from and/or display information to the first user 112a. Examples of these components include a physical keyboard, physical buttons, and a display, such as a touch display. The first communication device 220a can include any suitable components (e.g., a transceiver) configured for communication via the network 108. The first memory 224a can be any suitable storage medium (flash, hard disk, etc.) configured to store information at the mobile computing device 104. The first processor 216a can control operation of the first mobile computing device 104a, including, but not limited to, loading/executing an operating system of the first mobile computing device 104a, controlling input/output via the first user interface 212a, the first set of pressure sensors 204a, and the first set of haptic actuators 208a, controlling communication via the first communication device 220a, and controlling read/write operations at the first memory 224a. The term "processor" as used herein can refer to both a single processor and a plurality of processors operating in a parallel or distributed architecture.

As previously discussed, the first mobile computing device 104 is configured to both receive input via the first set of pressure sensors 204a and generate output via the first set of haptic actuators 208a to simulate hand holding between the by the first user 112a with the second user 112b, or another suitable physical interaction between the users 112. The first set of pressure sensors 204a can be any suitable grippable pressure sensor that the first user 112a can grip with their hand to apply a pressure. One example of a type of pressure sensor is a capacitive pressure sensor where capacitance changes based on a degree of displacement or "squeeze." In one embodiment, the first set of pressure sensors 204a are one or more external, standalone pressure sensors (e.g., a deformable ball sensor) that the first user 112a can squeeze. In another implementation, the first set of pressure sensors 204a can include a set of integrated pressures sensors attached to or integrated in the exterior surface 120a of the first mobile computing device 104a, and the first user 112a can squeeze the first mobile computing device 104a to provide input to the first set of pressure sensors 204a. For example only, the set of integrated pressure sensors may include a plurality of pressure sensors implemented about the exterior surface 120a of the first mobile computing device 104a. In one implementation, the set of pressure sensors 204a includes two pressure sensors attached to or integrated in the first mobile computing device 104a along its two longer edges/sides.

In one implementation, the first set of haptic actuators 208a includes the first set of vibrators 228a. The first set of vibrators 228 can be integrated in the first mobile computing device 104a and configured to vibrate the first mobile computing device 104a. In some implementations, this vibration is not localized. That is, the entire first mobile computing device 104a vibrates. In another implementation, the first set of haptic actuators 208a includes a set of piezoelectric actuators that are separate from the first set of vibrators 228a. This set of piezoelectric actuators could be integrated in, partially integrated in, or external/standalone from the first mobile computing device 104a (e.g., communication via the short-range wireless communication medium). For example, each piezoelectric actuator can receive a variable current that alters its stiffness. In some implementations, the piezoelectric actuators are configured to provide localized haptic output to the first user 112a, which may allow for a more realistic or life-like simulated interaction. Other suitable types/configurations of the haptic actuators 208a could be implemented, such as a motor attached to a freely-moving element within the first mobile computing device 104a, as well as a movable body configured to extend/retract within a fixed degree from the external surface 228a of the first mobile computing device 104a.

Figure 2B:
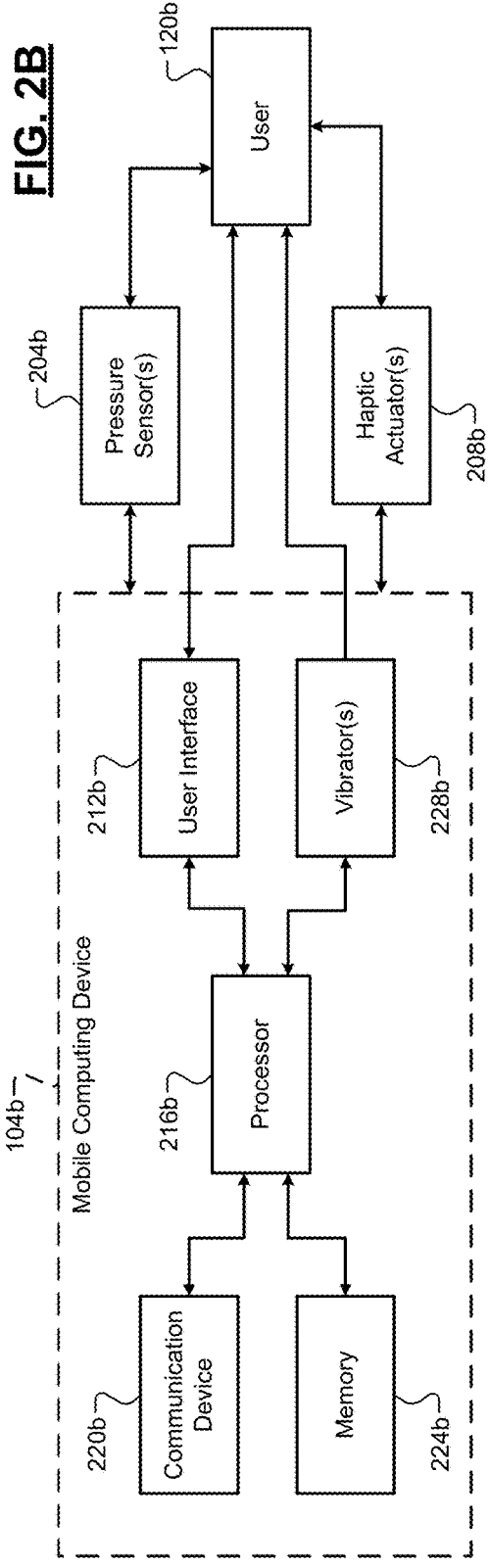

Referring now to FIG. 2B, the second mobile computing device 104b can have the same or similar configuration as the first mobile computing device 104a. More particularly, a second set of pressure sensors 204b and a second set of haptic actuators 208b may each have the same or a different configuration than the first set of pressure sensors 204a and the first set of haptic actuators 204a, respectively. For example only, the first set of pressure sensors 204a may include one or more external, standalone pressure sensors whereas the second set of pressure sensors 204b may include a plurality of integrated pressure sensors arranged about the exterior surface 120b. Additionally, for example only, the first set of haptic actuators 208a may include a set of piezoelectric actuators that are separate from one or more first vibrators 228a whereas the second set of haptic actuators 208b may include the one or more second vibrators 228b. While the following discussion is with respect to operations performed by the first mobile computing device 104a, it should be appreciated that the following operations could be performed by the second mobile computing device 104b.

The first mobile computing device 104a can receive a first input signal from the first set of pressure sensors 204a. The first input signal can be generated by the first set of pressure sensors 204a in response to a first force applied by the first user 112a. For one or more external, standalone pressure sensors, the first user 112a can provide a squeeze input and the first set of pressure sensors 204a can generate the input signal in response to the squeeze input. The first set of pressure sensors 204a can then communicate the first input signal to the first communication device 220a of the first mobile computing device 104a via a short-range wireless communication medium. Alternatively, for a set of integrated pressure sensors, each of the set of integrated pressure sensors 204a can receive a squeeze input from the first user 112a and then collectively generate the first input signal in response to the squeeze input. The first mobile computing device 104a can transmit, to the second mobile computing device 104b, the first input signal. The receipt of the first input signal can cause the second mobile computing 104b device to generate and output a first output signal based on the first input signal. The output of the first output signal can cause the second set of haptic actuators 208b associated to generate a second force to be felt by the second user 112b.

The first mobile computing device 104a can also receive, from the second mobile computing device 104b, a second input signal. The second input signal can be received at the second mobile computing device 104b from the second set of pressure sensors 204b in response to a third force applied by the second user 112b. The first mobile computing device 104a can generate a second output signal based on the second input signal. For example, the second output signal may have a magnitude corresponding to a magnitude of the second input signal. In this manner, the users 112 can feel the degree of force applied by each other. The first mobile computing device 104a can output, to the first set of haptic actuators 208a, the second output signal. The output of the second output signal can cause the first set of haptic actuators 208a to generate a fourth force to be felt by the first user 112a. This process can repeat and the users 112 can continuously adjust the force they are applying while feeling the force applied by the other.

Figure 3:
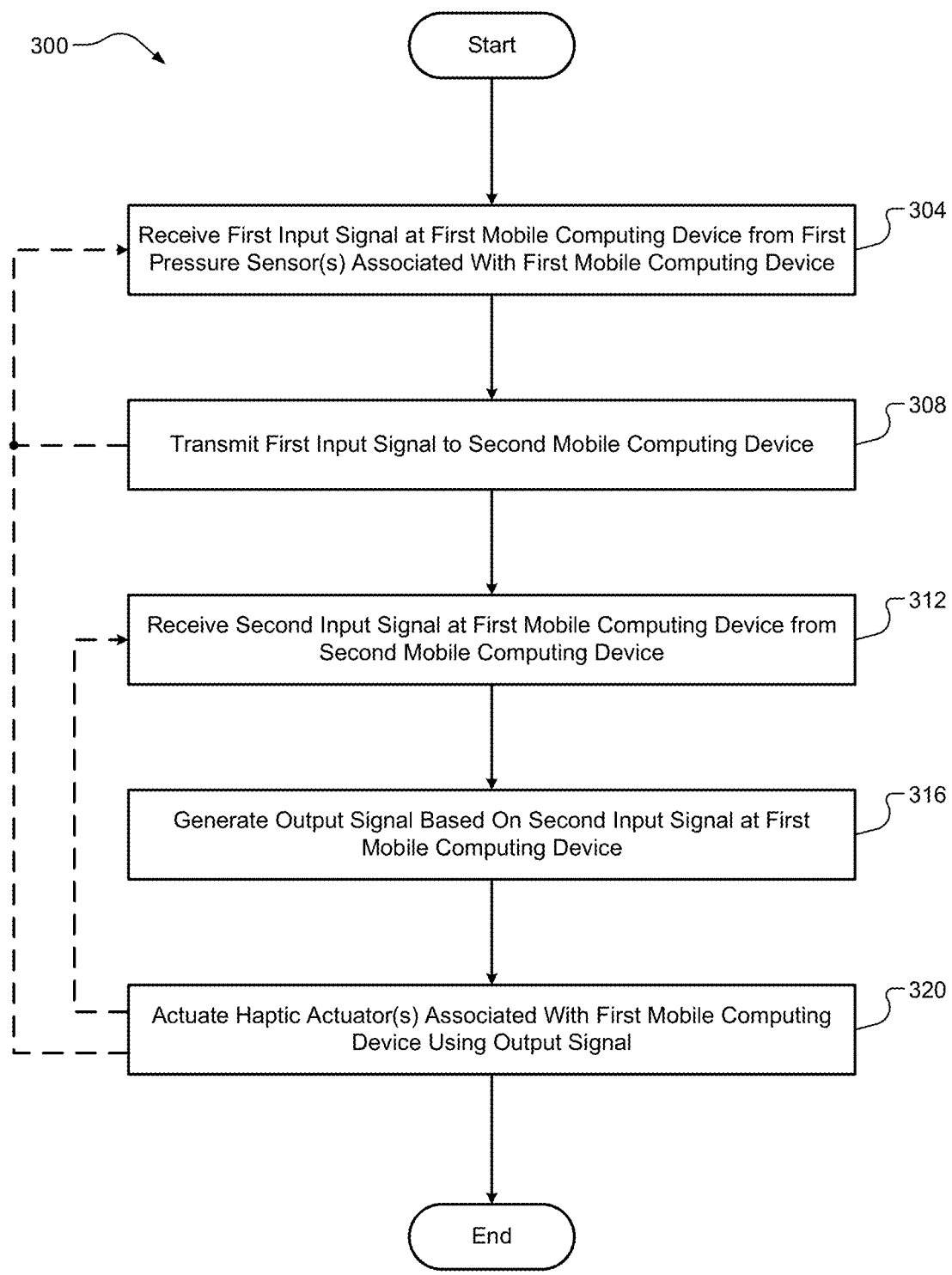
FIG. 3 is a flow diagram of an example technique for simulated physical interaction between users via their mobile computing devices according to some implementations of the present disclosure.

Referring now to FIG. 3, a flow diagram of an example technique 300 for simulated physical interaction between the users 112 via their mobile computing devices 104 is illustrated. At 304, the first mobile computing device 104a can receive a first input signal from the first set of pressure sensors 204a. The first input signal can be generated by the first set of pressure sensors 204a in response to a force applied by the first user 112a. At 308, the first mobile computing device 104a can transmit, to the second mobile computing device 104b, the first input signal. The receipt of the first input signal can cause the second mobile computing device 104b to generate and output a first output signal based on the first input signal. For example, the first output signal may have a magnitude corresponding to a magnitude of the first input signal. The output of the first output signal can cause the second set of haptic actuators 208b to generate a second force to be felt by the second user 112b. The technique 300 can then end, return to 304, or proceed to 312.

At 312, the first mobile computing device 104a can receive, from the second mobile computing device 104b, a second input signal. The second input signal can be received at the second mobile computing device 104b from the second set of pressure sensors 204b associated with the second mobile computing device 104b in response to a third force applied by the second user 112b. At 316, the first mobile computing device 104a can generate a second output signal based on the second input signal. For example, the second output signal may have a magnitude corresponding to a magnitude of the second input signal. At 320, the first mobile computing device 104a can output the second output signal to the first set of haptic actuators 208a. The outputting of the second output signal can cause the first set of haptic actuators 208a to generate a fourth force to be felt by the first user 112a. The technique 300 can then end, return to 304, or return to 312.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, by a first mobile computing device, a first pressure sensor input of a pressure sensor that is configured to detect a magnitude of applied pressure associated with a first user;
transmitting, by the first mobile computing device, a signal to a second mobile computing device, wherein the signal corresponds to the magnitude of the applied pressure;
receiving, by the first mobile computing device, a signal from the second mobile computing device that corresponds to a second pressure sensor input for the second mobile computing device, wherein the second pressure sensor input is associated with pressure associated with a second user; and
causing, by the first mobile computing device, a haptic actuator communicatively coupled to the first mobile computing device to generate a haptic output corresponding to the pressure associated with the second user, wherein the haptic actuator causes a body configured to extend or retract to alter stiffness to generate the haptic output.

2. The computer-implemented method of claim 1, wherein the first mobile computing device is positioned on a head, a shoulder, a back, or a wrist of the first user.

3. The computer-implemented method of claim 1, wherein the first mobile computing device is communicatively coupled to a device in clothing of the first user.

4. The computer-implemented method of claim 1, wherein the pressure sensor comprises a deformable pressure sensor.

5. The computer-implemented method of claim 1, wherein the haptic actuator comprises one or more piezoelectric actuators external to the first mobile computing device.

6. The computer-implemented method of claim 1, wherein the haptic actuator comprises a plurality of haptic actuators on one or more sides of the first mobile computing device.

7. The computer-implemented method of claim 1, wherein the first mobile computing device is communicatively coupled to a movable body in contact with the first user.

8. A system comprising one or more processors configured to perform operations comprising:
receiving, by a first mobile computing device, a first pressure sensor input of a pressure sensor that is configured to detect a magnitude of applied pressure associated with a first user;
transmitting a signal to a second mobile computing device, wherein the signal corresponds to the magnitude of the applied pressure;
receiving a signal from the second mobile computing device that corresponds to a second pressure sensor input for the second mobile computing device, wherein the second pressure sensor input is associated with pressure associated with a second user; and
causing a haptic actuator communicatively coupled to the first mobile computing device to generate a haptic output corresponding to the pressure associated with the second user, wherein the haptic actuator causes a body configured to extend or retract to alter stiffness to generate the haptic output.

9. The system of claim 8, wherein the first mobile computing device is positioned on a head, a shoulder, a back, or a wrist of the first user.

10. The system of claim 8, wherein the first mobile computing device is communicatively coupled to a device in clothing of the first user.

11. The system of claim 8, wherein the pressure sensor comprises a deformable pressure sensor.

12. The system of claim 8, wherein the haptic actuator comprises one or more piezoelectric actuators external to the first mobile computing device.

13. The system of claim 8, wherein the haptic actuator comprises a haptic actuator on one or more sides of the first mobile computing device.

14. A non-transitory, computer-readable medium having instructions stored thereon that, when executed by one or more processors, cause the one or more processors to perform operations comprising:
receiving a first pressure sensor input of a pressure sensor that is configured to detect a magnitude of applied pressure associated with a first user;
transmitting a signal to a second mobile computing device, wherein the signal corresponds to the magnitude of the applied pressure;
receiving a signal from the second mobile computing device that corresponds to a second pressure sensor input of the second mobile computing device, wherein the second pressure sensor input is associated with a pressure associated with a second user; and
causing a haptic actuator communicatively coupled to the first mobile computing device to generate a haptic output corresponding to the pressure associated with the second user, wherein the haptic actuator causes a body configured to extend or retract to alter stiffness to generate the haptic output.

15. The non-transitory, computer-readable medium of claim 14, wherein the first mobile computing device is positioned on a head, a shoulder, a back, or a wrist of the first user.

16. The non-transitory, computer-readable medium of claim 14, wherein the first mobile computing device communicatively coupled to a device in clothing of the first user.

17. The non-transitory, computer-readable medium of claim 14, wherein the pressure sensor comprises a deformable pressure sensor.

18. The non-transitory, computer-readable medium of claim 14, wherein the haptic actuator comprises one or more piezoelectric actuators external to the first mobile computing device.

19. The non-transitory, computer-readable medium of claim 14, wherein the haptic actuator comprises a plurality of haptic actuators on one or more sides of the first mobile computing device.

20. The non-transitory, computer-readable medium of claim 14, wherein the first mobile computing device is communicatively coupled to a movable body in contact with the first user.

* * * * *